United States Patent
Seidler et al.

(10) Patent No.: US 9,434,396 B2
(45) Date of Patent: Sep. 6, 2016

(54) LOCAL OPERATION OF A COMPONENT OF A RAILWAY TRACK SYSTEM

(71) Applicant: SIEMENS AKTIENGESELLSCHAFT, Munich (DE)

(72) Inventors: Gerald Seidler, Wolfenbuettel (DE); Achim Weitner-Von-Pein, Braunschweig (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/424,507

(22) PCT Filed: Aug. 19, 2013

(86) PCT No.: PCT/EP2013/067236
§ 371 (c)(1),
(2) Date: Feb. 27, 2015

(87) PCT Pub. No.: WO2014/033001
PCT Pub. Date: Mar. 6, 2014

(65) Prior Publication Data
US 2015/0210303 A1 Jul. 30, 2015

(30) Foreign Application Priority Data
Aug. 28, 2012 (DE) .................. 10 2012 215 260

(51) Int. Cl.
*B61L 11/08* (2006.01)
*B61L 23/00* (2006.01)
*B61L 11/00* (2006.01)
*B61L 19/06* (2006.01)
(Continued)

(52) U.S. Cl.
CPC .............. *B61L 23/00* (2013.01); *B61L 11/00* (2013.01); *B61L 19/06* (2013.01); *H04W 4/008* (2013.01); *B61L 11/08* (2013.01); *B61L 27/0005* (2013.01)

(58) Field of Classification Search
CPC ........ B61L 23/00; B61L 19/06; B61L 11/00; B61L 11/08; B61L 27/0005; B60L 5/10; B60L 5/102; H04W 4/008
See application file for complete search history.

(56) References Cited

U.S. PATENT DOCUMENTS

2010/0072326 A1* 3/2010 Click ..................... B61L 5/10 246/393
2012/0176217 A1* 7/2012 Tamaribuchi ........... B61L 23/06 340/5.7
2013/0206924 A1 8/2013 Vogt et al.

FOREIGN PATENT DOCUMENTS

CN 1601535 A 3/2005
CN 101697245 A 4/2010
(Continued)

*Primary Examiner* — Michael J Zanelli
(74) *Attorney, Agent, or Firm* — Laurence Greenberg; Werner Stemer; Ralph Locher (57) ABSTRACT

A component of a railway track system is locally operated. The railway track system is operated while local operation of a component of the railway track system is enabled. A component identifier which identifies the component of the railway track system is queried using a mobile radio terminal via a close-range communication link and the identifier is transmitted to a control or signal box device via a radio link The component identifier of the component is checked in the control or signal box device, and, if the identifier check is successful, an enable command is generated which enables local operation of the component.

15 Claims, 6 Drawing Sheets

(51) Int. Cl.
  *H04W 4/00* (2009.01)
  *B61L 27/00* (2006.01)

(56) References Cited

FOREIGN PATENT DOCUMENTS

| | | |
|---|---|---|
| CN | 101722971 A | 6/2010 |
| CN | 101789966 A | 7/2010 |
| DE | 19508731 A1 | 8/1996 |
| DE | 19905916 A1 | 8/1999 |
| DE | 102010034903 A1 | 2/2012 |
| EP | 1923292 A2 | 5/2008 |
| EP | 1944215 A2 | 7/2008 |
| EP | 1946989 A2 | 7/2008 |
| EP | 2085287 A1 | 8/2009 |
| EP | 2230148 A1 | 9/2010 |
| JP | 2011-116272 * | 6/2011 |
| WO | 2012022613 A1 | 2/2012 |

* cited by examiner

LOCAL OPERATION OF A COMPONENT OF A RAILWAY TRACK SYSTEM

BACKGROUND OF THE INVENTION

Field of the Invention

The invention relates to a method for operating a railroad track system, enabling a component of the railroad track system to be locally controlled by an operator.

For operating an extensive railroad track system which is monitored and/or controlled by a control or interlocking facility, it is advantageous if at least some of the components of the railroad track system can be directly maintained, inspected or repaired locally by an operator. In general, local operation requires the presence of the operator on-site as well as communication between the operator and the control or interlocking facility in order to prevent a hazardous situation. The personnel in the control or interlocking facility currently communicate by telephone with the operator on the ground.

BRIEF SUMMARY OF THE INVENTION

The object of the invention is to specify a method for operating a railroad track system whereby a component can be operated in a particularly safe manner with the assistance of operators locally.

This object is achieved according to the invention by a method of operating a railroad track system wherein local operation of a component of the railroad track system is enabled. Advantageous embodiments of the method according to the invention are set forth in sub-claims.

It is accordingly provided according to the invention that, using a mobile communication device, a component ID identifying the component of the railroad track system is requested via a short-range communication link, and this component ID is transmitted via a radio link to a control or interlocking facility, the component ID of the component is checked in the control or interlocking facility and an enable command allowing local operation of the component is generated if the ID check is successful.

An important advantage of the method according to the invention is that this inventively provided short-range communication between the mobile communication device and the component to be operated enables a check to be performed to ascertain whether the operator wishing to undertake or initiate an operator control action is actually in immediate proximity to the component to be operated. Only if a short-range communication link exists or has existed will it be assumed that the operator is actually on-site and that operator-assisted operation of the component can be permitted. In other words, the inventive concept is therefore that the performance of operator control actions or participation in operator control actions can be prevented unless the operator is demonstrably on-site and able to monitor the operator control action.

For example, the short-range communication link can be established in accordance with the NFC (Near Field Communication) standard. The radio link is preferably a long-range link, e.g. in accordance with the GSM, GPRS, UMTS or EDGE standard.

The mobile communication device can be a cell phone or smart phone enabling both NFC and long-range communication (e.g. Google Nexus S and Samsung Galaxy S2). Alternatively, the mobile communication device can be a portable computer, e.g. in the form of a laptop or tablet; in this case it is only necessary to provide a short-range communication component and a radio component for the radio link which are connected to the computer via interfaces.

In order to ensure that the component IDs received by the control or interlocking facility are current, it is regarded as advantageous if the component sends, as a component ID or in addition to the component ID, a signed time stamp to the mobile communication device via the short-range communication link and this signed time stamp is transmitted via the radio link to the control or interlocking facility, the signed time stamp is checked in the control or interlocking facility to verify that it is current and the enable command is generated if the signed time stamp is current. A signed time stamp enables the component ID transmitted to the control or interlocking facility to be checked to verify that it is current and establish when the operator has been in direct proximity to the component to be operated.

In the control or interlocking facility it is preferably also checked whether the mobile communication device or the registered user of the mobile communication device is authorized to exercise control over the component in question.

In order to ensure that, in the case of operator control actions extending over a longer period, the operator is actually present during the entire operation, it is considered advantageous if the ID check described or more specifically the signature checking and generation of the enable commands are repeated at regular or irregular intervals.

The enable command preferably allows remote control of the component by control commands, in particular voice control commands, which are transmitted from the mobile communication device to the control or interlocking facility via the radio link.

The control commands or voice control commands which are transmitted from the mobile communication device to the control or interlocking facility are preferably implemented by the control or interlocking facility by the latter sending actuating signals via the radio link to the mobile communication device and the mobile communication device forwarding the actuating signals to the component via the short-range communication link.

Alternatively, the control commands or voice control commands which are transmitted from the mobile communication device to the control or interlocking facility are implemented by the control or interlocking facility by the latter transmitting these actuating signals to the component via a link excluding the mobile communication device.

In the last mentioned variant, it is considered advantageous if the control or interlocking facility transmits the actuating signals via a control cable interconnecting the control or interlocking facility and the component.

The component to be operated locally can preferably be a keylock device containing a key for local operation of another component. In this case the enable command preferably releases the keylock device.

The enable command for the keylock device is transmitted via the radio link from the control or interlocking facility to the mobile communication device and from there to the keylock device via the short-range communication link.

Alternatively, the control or interlocking facility can transmit the enable command via a control cable interconnecting the keylock device and the control or interlocking facility.

The invention also relates to a component of a railroad track system, in particular to a component suitable for being monitored and/or controlled by a control or interlocking facility of the railroad track system.

It is inventively provided that the component has a short-range communication device and a control device connected to the short-range communication device, and that the control device is suitable for processing an interrogator signal which is received via the short-range communication link and used to request a component ID identifying the component, and for transmitting an ID signal containing the component ID of the component, in particular a signature signal, via the short-range communication link.

In respect of the advantages of the component according to the invention, reference is made to the above description relating to the method according to the invention, as the advantages of the method according to the invention correspond to those of the component according to the invention.

It is considered advantageous if the component is a keylock device which can be unlocked by the control or interlocking device to release the key.

The invention also relates to a control or interlocking facility for monitoring and controlling least one component of a railroad track system. It is inventively provided that the control or interlocking facility comprises a computer device which, on receiving a component ID identifying the component of the railroad track system, is programmed to check the ID and, if the ID check is successful, to generate an enable command enabling local operation of the component.

In respect of the advantages of the control or interlocking facility according to the invention, reference is made to the above description relating to the method according to the invention, as the advantages of the method according to the invention correspond to those of the control or interlocking facility according to the invention.

The invention will now be explained in greater detail with reference to exemplary embodiments and the accompanying drawings in which, by way of example

BRIEF DESCRIPTION OF THE SEVERAL VIEWS OF THE DRAWING

In the figures, the same reference characters are always used for identical or comparable components for the sake of clarity.

DESCRIPTION OF THE INVENTION

Figure 1:
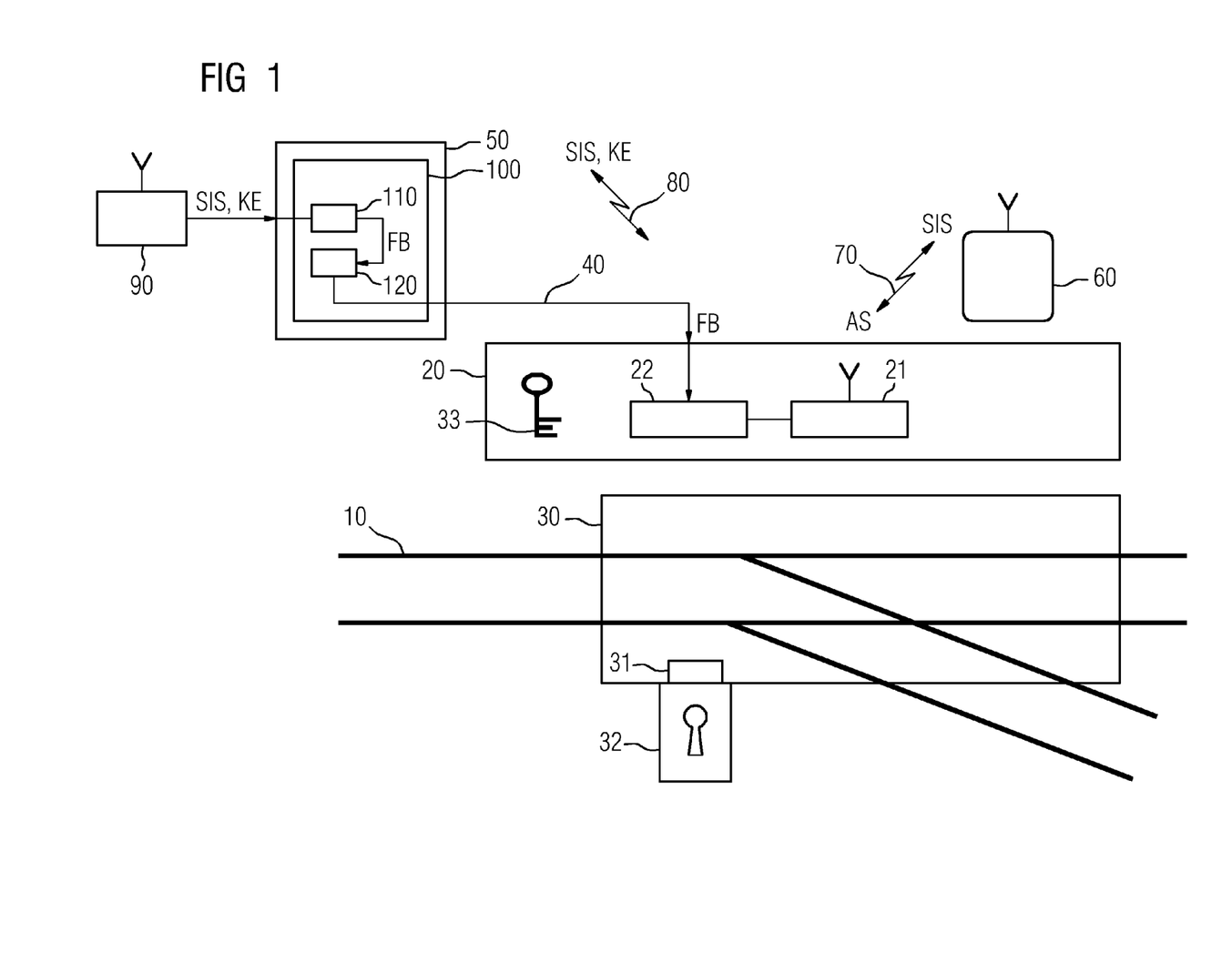
FIG. 1 shows an exemplary embodiment of an arrangement comprising a control or interlocking facility for operating a railroad track system, wherein, using the example of a keylock device, a method for verifying the local presence of a mobile communication device is illustrated, wherein the method involves forwarding an enable command for releasing the keylock device via a control cable.

FIG. 1 illustrates a section of a railroad track system 10 showing, among other things in FIG. 1, a first component in the form of a keylock device 20 and a second component in the form of a switch 30.

The switch 30 is capable of local operation e.g. for maintenance, repair or troubleshooting purposes and is accordingly equipped with an operator control device 31. In order to ensure that the operator control device 31 can only be used by authorized personnel, the switch 30 also has a lock 32 which protects the operator control device 31 from unauthorized access. In order to enable the operator control device 31 to be operated, the lock 32 must first be unlocked by means of a key 33. The key 33 for unlocking or releasing the lock 32 is in the keylock device 20 which stores the key 33 and protects it from unauthorized access by third parties. Authorized operating personnel can gain access to the key 33 by the keylock device 20 being opened from a centralized location. For this purpose the keylock device 20 is connected to a control or interlocking facility 50 by a control cable 40.

The keylock device 20 according to FIG. 1 is also suitable for communicating with a mobile communication device 60 locally, i.e. in immediate proximity to the keylock device 20. For this purpose the keylock device 20 has a short-range communication device 21 which interacts with a control device 22 of the keylock device 20. The short-range communication device 21 enables the keylock device 20 to maintain a short-range communication link 70 with the mobile communication device 60.

The short-range communication device 21 and the control device 22 of the keylock device 20 can constitute, for example, a so-called RFID tag.

The short-range communication can be based, for example, on the so-called NFC (Near Field Communication) standard as is currently available on mobile communication devices (e.g. Google Nexus S and Samsung Galaxy S2).

It can also be seen from FIG. 1 that the mobile communication device can communicate with the control or interlocking facility 50, namely via a radio link 80. As FIG. 1 shows, the radio link 80 is established via a radio device 90 which can be part of the control or interlocking facility 50 as an internal component or alternatively can be a separate external component which is connected to the control or interlocking facility 50 via a connecting cable, as FIG. 1 shows by way of example.

The control or interlocking facility 50 has a computer device 100 which, on the basis of appropriate programming, constitutes, among other things, a verification module 110 and a component control module 120.

The arrangement according to FIG. 1 can be operated, for example, as follows:

If an operator wishes to operate the operator control device 31 of the switch 30, e.g. for maintenance, repair or troubleshooting purposes, he/she requires for this purpose the key 33 which must be inserted into the lock 32. As the key 33 is in the keylock device 20 in the operating state shown in FIG. 1, the operator must gain access to the key 33 and first unlock the keylock device 20.

In order to achieve said unlocking or releasing of the keylock device 20, the operator will use the mobile communication device 60 to establish a short-range communication link 70 with the short-range communication device 21 of the keylock device 20 and transmit an interrogator signal AS to the short-range communication device 21 and the control device 22.

With the interrogator signal AS, the mobile communication device 60 requests the keylock device 20 to transmit a component ID identifying the keylock device 20 to the mobile communication device 60. The keylock device 20 will preferably communicate the component ID in the form of a signature and transmit a signature signal SIS containing the signature to the mobile communication device 60 as an ID signal which contains or specifies the requested component ID.

The signature signal SIS can contain a time stamp, for example, which is signed with a signature key stored in the keylock device 20. Such a signed time stamp preferably indicates the time of day at which the signature signal SIS has been generated. The signature with the signature key protects the signature signal SIS of the keylock device 20 from falsification or manipulation, e.g. by the mobile communication device 60.

When it has received the signature signal SIS, the mobile communication device 60 will transmit it via the radio link 80 and the radio device 90 to the control or interlocking facility 50. The mobile communication device 60 will also preferably transmit its own identifier KE with which the mobile communication device 60 identifies itself to the control or interlocking facility 50.

The signature signal SIS is checked by the computer device 100 or more precisely by the verification module 110 which constitutes the computer device 100 as part of a predefined signature verification procedure. In this procedure, the verification module 110 will preferably check whether the signature signal SIS contains a signed time stamp giving the time of day of the generation of the signature signal SIS. The verification module 110 will then preferably only generate an enable command FB for releasing the keylock device 20 if both the time stamp contained in the signature signal SIS is sufficiently current and the identifier KE identifies a mobile communication device 60 which is authorized to open the keylock device 20 and/or to operate the switch 30. If these conditions are not fulfilled, the verification module 110 will refuse a release and will not generate the enable command FB.

In the following it will be assumed, for example, that signature verification was successful and the verification module 110 has generated the enable command FB. The enable command FB is fed from the verification module 110 to the component control module 120 which transmits the enable command FB to the keylock device 20 via the control cable 40.

As soon as the control device 22 has received the enable command FB via the control cable 40, it will release the key 33 present therein, e.g. by unlocking a locking flap of the keylock device 20, thereby making the key 33 accessible.

As soon as the keylock device 20 has been opened, the owner of the mobile communication device 60 can remove the key 33, unlock the lock 32 and operate the operator control device 31 of the switch 30 for maintenance, repair or troubleshooting purposes.

Figure 2:
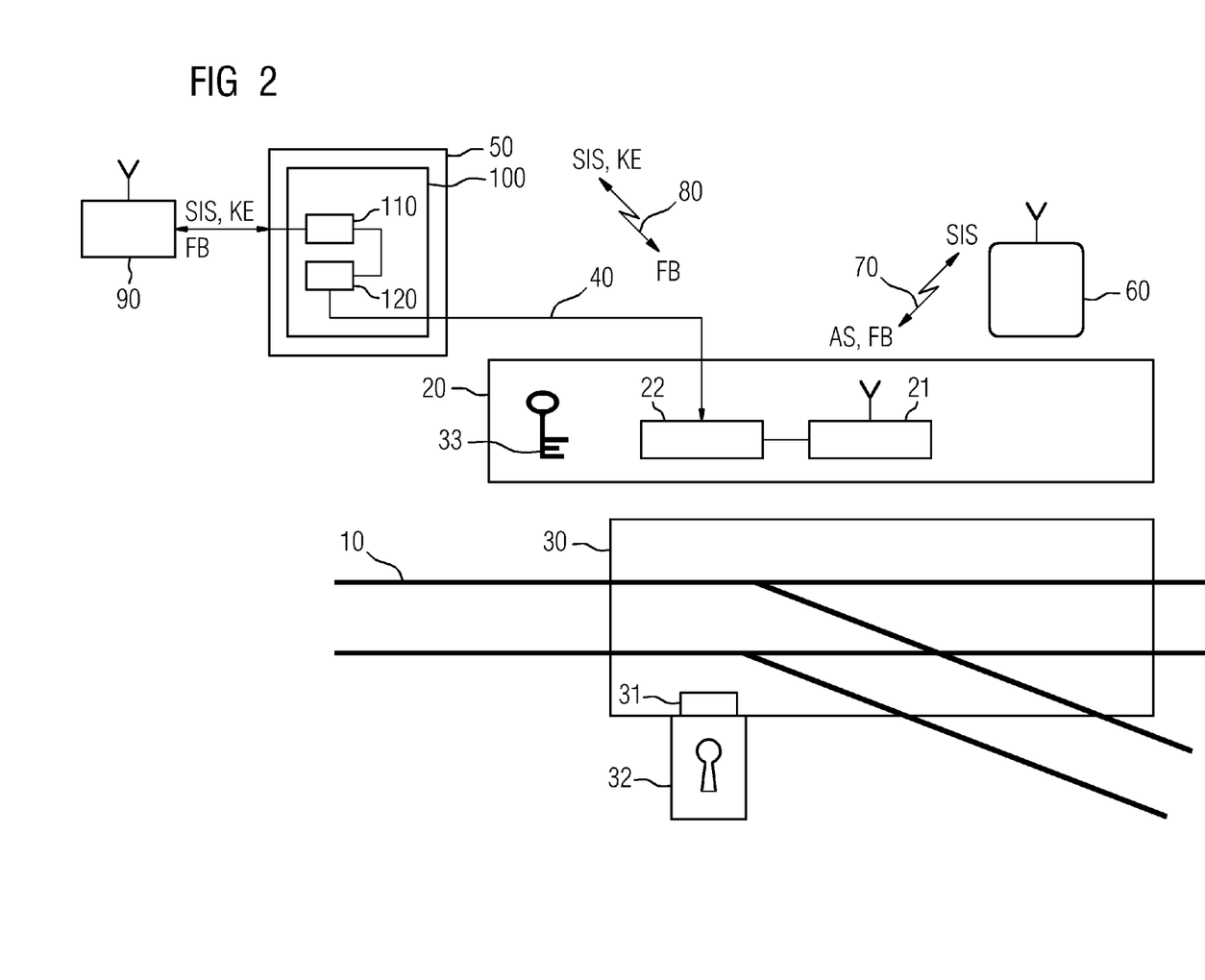
FIG. 2 shows the forwarding of an enable command for releasing the keylock device according to FIG. 1 via a radio link.

FIG. 2 shows another variant for operating the keylock device 20 according to FIG. 1. In this variant, the enable command FB is not transmitted from the verification module 110 to the keylock device 20 via the component control module 120 and the control cable 40 but is instead transmitted to the mobile communication device 60—preferably in encrypted form—via the radio link 80. As soon as the mobile communication device 60 has received the enable command FB, it will transmit it via the short-range communication link 70 to the short-range communication device 21 from where the enable command FB is fed to the control device 22. As soon as the control device 22 has received the enable command FB and successfully decrypted it, it will release the keylock device 20 and allow access to the key 33 as has already been explained in connection with FIG. 1.

Figure 3:
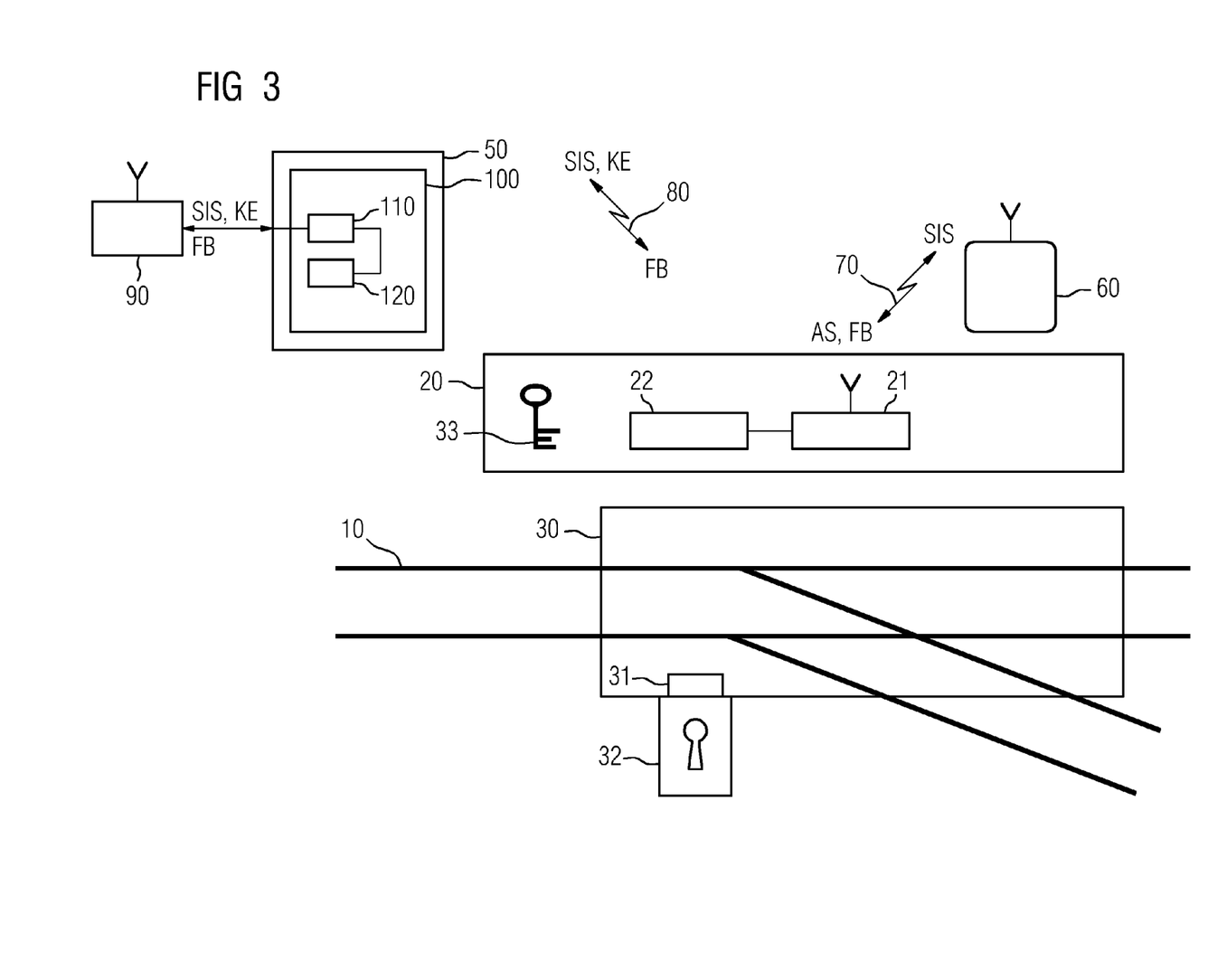
FIG. 3 shows an exemplary embodiment of an arrangement comprising an exclusively radio controlled keylock device.

As both the signature signal SIS and the enable command FB are transmitted via the radio link 80 in the variant according to FIG. 2, a control cable 40 between the control or interlocking facility 50 and the keylock device 20 is unnecessary. Such a control cable 40 can typically be dispensed with, as shown by way of example in FIG. 3.

Figure 4:
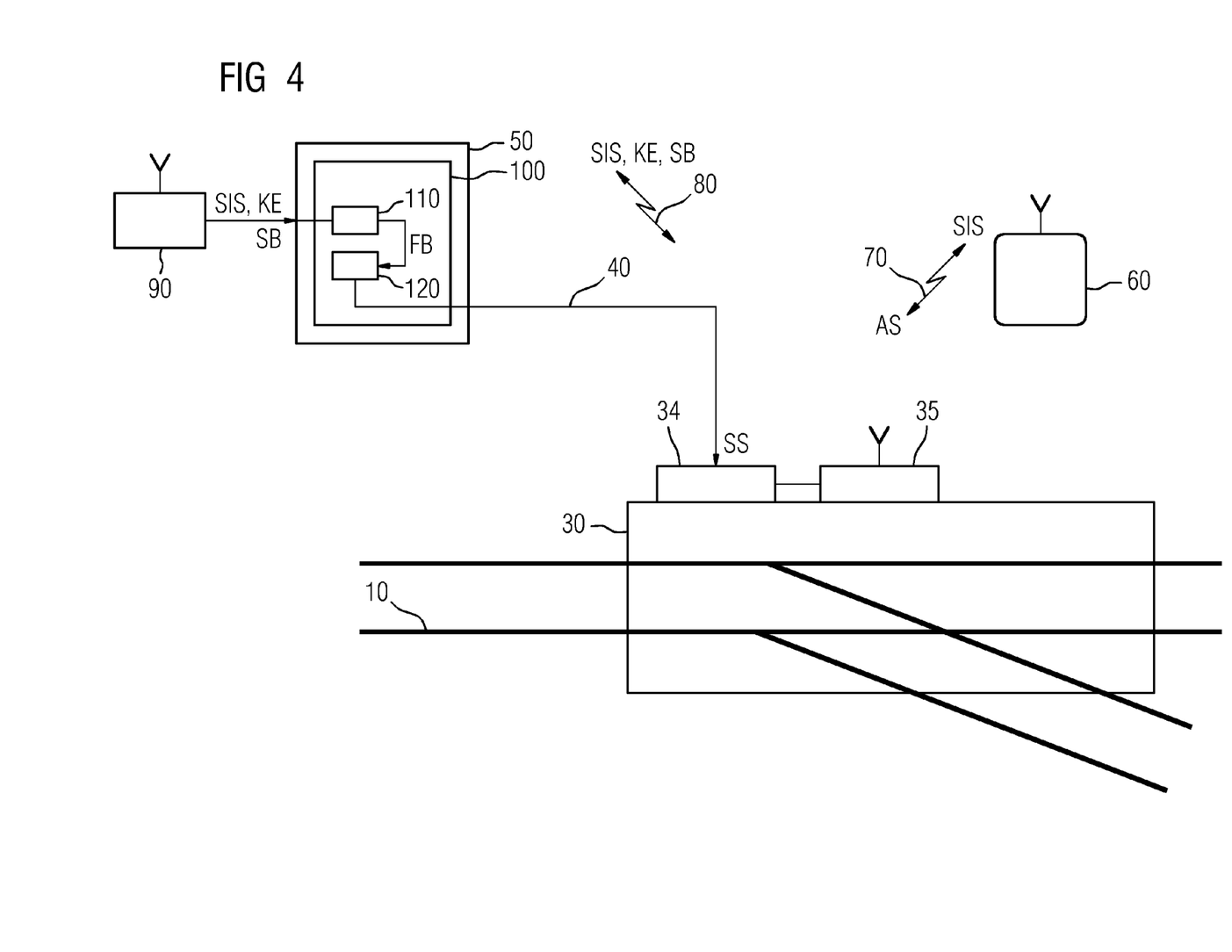
FIG. 4 shows an exemplary embodiment of an arrangement comprising a control or interlocking facility for operating a railroad track system, wherein, using the example of a switch, a method for verifying the local presence of a mobile communication device and for local operation of the switch is illustrated by way of example, wherein the method involves transmitting actuating signals from the control or interlocking device to the switch via a control cable.

FIG. 4 shows another exemplary embodiment of an arrangement in which local operator control is possible. Illustrated here is a switch 30 which is equipped with a control device 34 and a short-range communication device 35. The short-range communication device 35 provides a short-range communication link 70 between the switch 30 and a mobile communication device 60 which is located in immediate proximity to the switch 30.

If an operator wishes to operate the switch 30 locally, e.g. for maintenance, repair or troubleshooting purposes, the control or interlocking facility 50 will check whether the operator or rather the mobile communication device 60 registered to the operator is in the vicinity of the switch 30. In order to initiate local verification of this kind, the mobile communication device 60 will first generate an interrogator signal AS and transmit it via the short-range communication link 70 to the short-range communication device 35 of the switch 30. The interrogator signal AS is fed from there to the control device 34 which processes the interrogator signal AS and generates a signature signal SIS. The signature signal SIS can contain, for example, a signed time stamp which contains the time of day of signature signal generation in signed form.

The signature signal SIS is sent via the short-range communication device 35 to the mobile communication device 60 and is transmitted from there via the radio link 80 to the control or interlocking facility 50. During transmission of the signature signal SIS, the mobile communication device 60 will also preferably transmit its own identifier KE which allows the mobile communication device to be identified.

When it has received the signature signal SIS, the verification module 110 constituted by the computer device 100 of the control or interlocking facility 50 will check the signature signal and generate an enable command FB for the component control module 120 if the signature check has been successful. As part of signature checking, the verification module 110 will preferably check both whether the signed time stamp contained in the signature signal SIS is current and whether the mobile communication device 60 or rather its user is authorized to exercise control over the switch 30. The release signal FB is not generated unless both conditions are fulfilled.

As soon as the component control module 120 has received the enable command FB, it will permit remote control or rather local operation by the mobile communication device 60. Local operation of this kind can mean, for example, that the mobile communication device 60 transmits control commands SB to the control or interlocking facility 50 for controlling, e.g. displacing, the switch 30. The incoming control commands SB will be checked for feasibility by the component control module 120 of the control or interlocking facility 50 and, if the control commands SB are feasible, will generate corresponding actuating signals SS which are transmitted to the switch 30 via the control cable 40.

In the exemplary embodiment according to FIG. 4, the switch 30 is operated locally by a form of remote control which involves the radio link 80 and the control or interlocking facility 50. The control commands SB which are generated by the mobile communication device 60 are processed by the component control module 120 into actuating signals SS which are transmitted via the control cable 40 to the control device 34 of the switch 30 so that the control device 34 can implement them.

As an alternative to transmitting the actuating signals SS via the control cable 40, the actuating signals SS can also be transmitted via the radio link 80. Such an embodiment is shown by way of example in FIG. 5.

Figure 5:
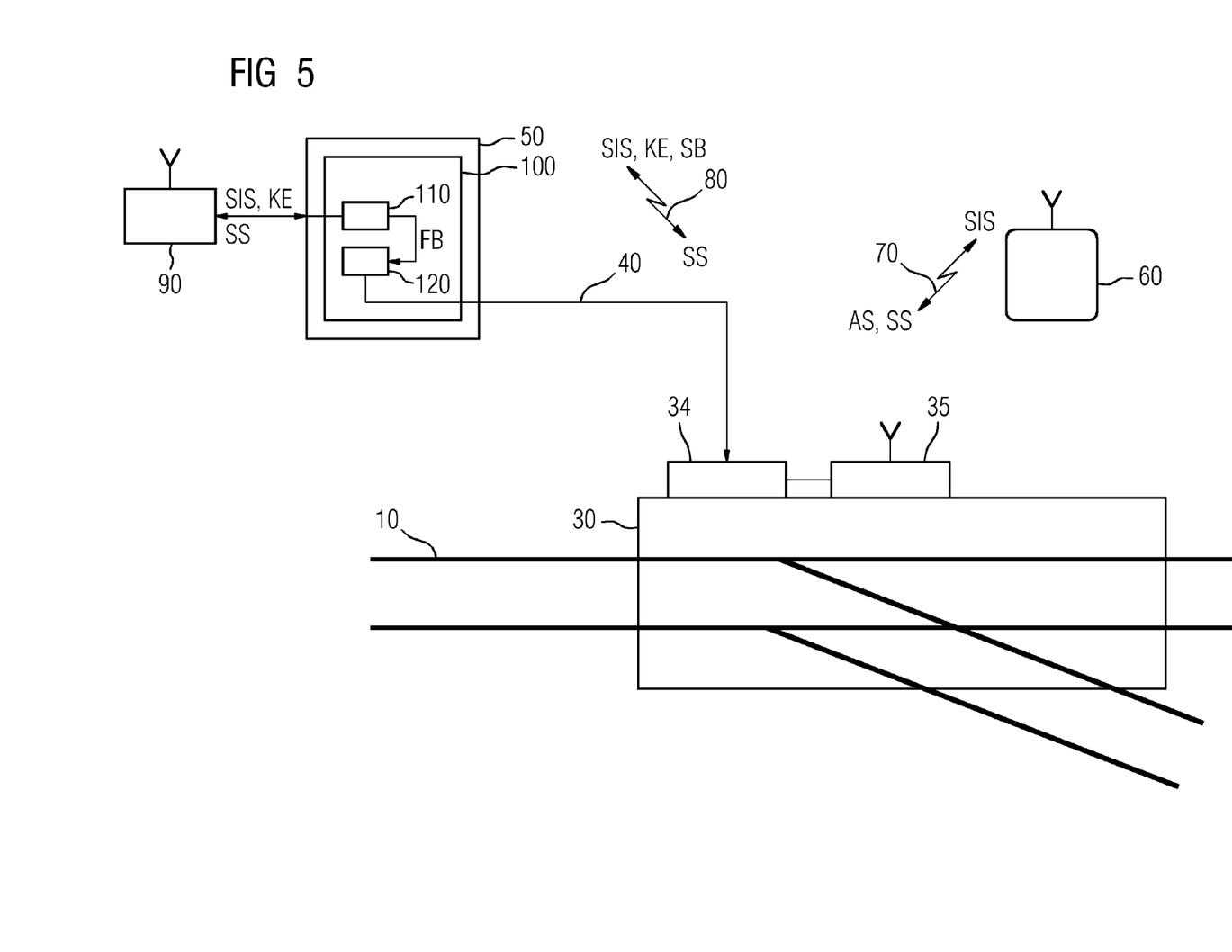
FIG. 5 shows, on the basis of the arrangement according to FIG. 4, a method variant in which actuating signals are transmitted from the control or interlocking device to the switch via the mobile communication device.

It can be seen from FIG. 5 that, on receiving the enable command FB from the verification module 110, the component control module 120 processes incoming control commands SB into control signals SS which are transmitted to the mobile communication device 60 via the radio device 90 and the radio link 80. The mobile communication device 60 will then transmit the actuating signals SS via the short-range communication link 70 to the short-range communication device 35 which forwards them to the control device 34 for implementation.

In order to prevent the mobile communication device 60 from generating the actuating signals SS automatically and without the knowledge or involvement of the control or interlocking facility 50, the actuating signals SS are preferably created in encrypted form so that the control device 34 of the switch 30 can check whether the actuating signals SS actually come from the control or interlocking facility 50 or more specifically are authorized by the latter.

The transmission of the control signals SS from the control or interlocking facility 50 by the radio link 80 and the mobile communication device 60 to the short-range communication device 50 as described in connection with FIG. 5 can also be replaced by direct transmission of the control commands SB to the switch 30. This is shown by way of example in FIG. 6.

Figure 6:
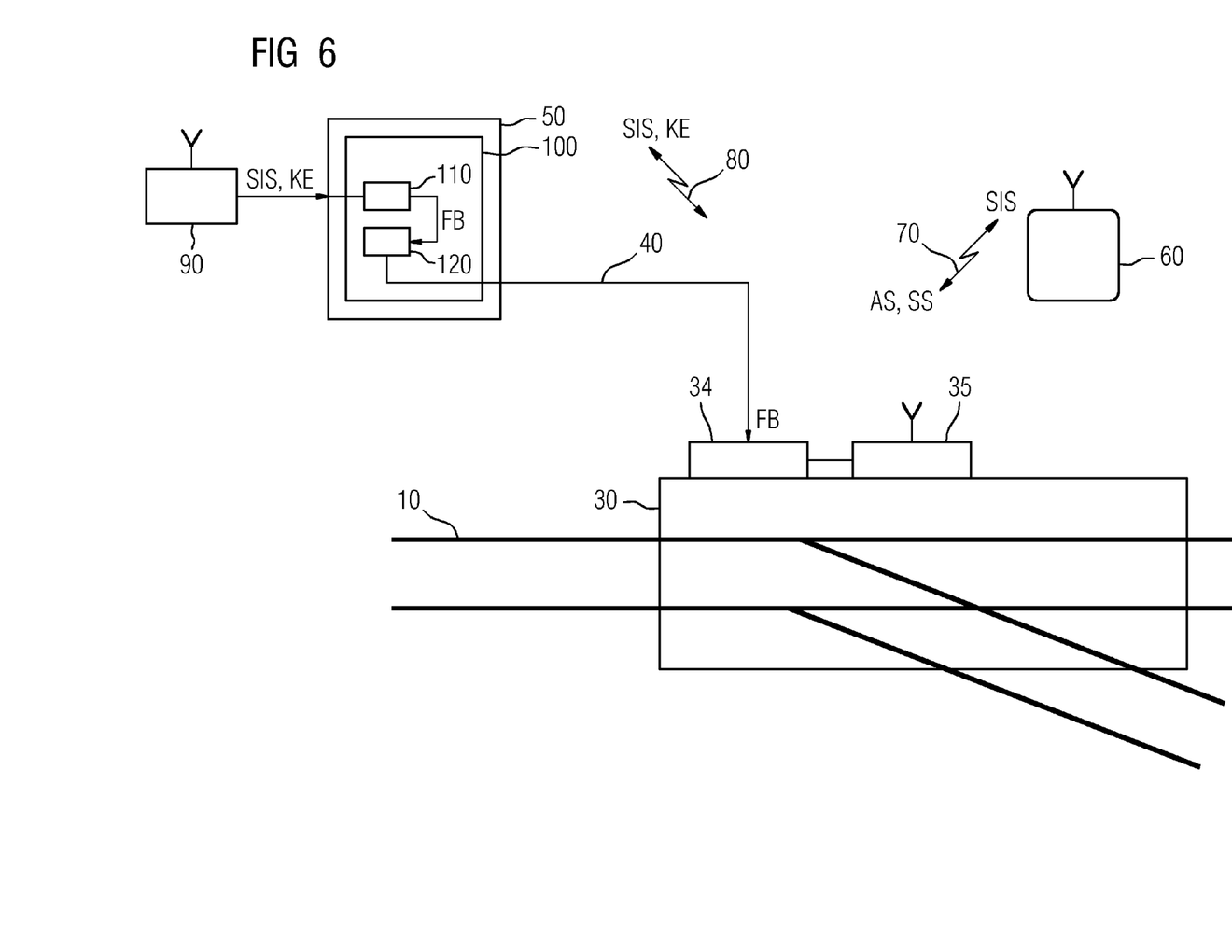
FIG. 6 shows direct control of the switch by the mobile communication device, wherein actuating signals are generated by the mobile communication device and transmitted to the switch via a short-range communication link.

In the exemplary embodiment according to FIG. 6, signature verification by the verification module 110 can take place, for example, exactly as described in connection with FIGS. 4 and 5. After the verification module 110 has generated the enable command FB, the component control module 120 will forward the enable command FB to the control device 34 via the control cable 40. This activates the control device 34 to receive further actuating signals SS coming from the mobile communication device 60 via the short-range communication link 70. This therefore makes it possible for the mobile communication device 60, after successful signature verification and after receipt of the enable command FB in the control device 34, to generate actuating signals SS automatically and transmit them directly via the short-range communication link 70 to the short-range communication device 35 and therefore to the control device 34. Direct control of the switch 30 by the mobile communication device 60 or rather its actuating signals SS will preferably only be permitted by the control or interlocking facility 50 if it has ensured by means of other appropriate safety measures that the switch 30 can be operated, e.g. displaced, in any manner by the operator locally without affecting the safety of the railroad track system 10.

Although the invention has been illustrated and described in detail by preferred exemplary embodiments, the invention is not limited by the examples disclosed and other variations may be inferred there from by the average person skilled in the art without departing from the scope of protection sought for the invention.

LIST OF REFERENCE CHARACTERS

10 railroad track system
20 keylock device
21 short-range communication device
22 control device
30 switch
31 operator control device
32 lock
33 key
34 control device
35 short-range communication device
40 control cable
50 control or interlocking facility
60 mobile communication device
70 short-range communication link
80 radio link
90 radio device
100 computer device
110 verification module
120 component control module
AS interrogator signal
FB enable command
KE identifier
SB control command
SIS signature signal
SS actuating signal

The invention claimed is:

1. A method for operating a railroad track system, wherein local operation of a component of the railroad track system is enabled, the method comprising:
   requesting, with a mobile communication device via a short-range communication link, a component ID identifying the component of the railroad track system;
   transmitting the component ID of the component via a radio link to a control or interlocking facility;
   checking the component ID of the component in the control or interlocking facility; and
   if the ID check is successful, generating an enable command enabling the local operation of the component.

2. The method according to claim 1, which comprises transmitting with the component as the component ID, or in addition to the component ID, a signed time stamp to the mobile communication device via the short-range communication link and transmitting the signed time stamp via the radio link to the control or interlocking facility;
   checking in the control or interlocking facility the signed time stamp to ascertain whether or not the time stamp is current; and
   generating the enable command if the signed time stamp is current and authorizing the mobile communication device or a user to which the mobile communication device is registered to exercise control over the component.

3. The method according to claim 1, wherein the enable command allows remote control of the component by control commands that are transmitted from the mobile communication device to the control or interlocking facility via the radio link.

4. The method according to claim 3, wherein the control commands are voice control commands.

5. The method according to claim 1, which comprises implementing the control commands received by the control or interlocking facility from the mobile communication device by transmitting actuating signals from the control or interlocking facility to the mobile communication device via the radio link and forwarding the actuating signals from the mobile communication device to the component via the short-range communication link.

6. The method according to claim 5, wherein the control commands are voice control commands received by the control or interlocking facility from the mobile communication device and the voice control commands are converted to corresponding actuating signals by the control or interlocking facility prior to transmitting the actuating signals to the mobile communication device.

7. The method according to claim 1, which comprises implementing the control commands received by the control or interlocking facility from the mobile communication device by transmitting actuating signals from the control or interlocking facility to the component via a link excluding the mobile communication device.

8. The method according to claim 7, wherein the control commands are voice control commands received by the control or interlocking facility from the mobile communication device and the voice control commands are converted to corresponding actuating signals by the control or interlocking facility prior to transmitting the actuating signals to the component.

9. The method according to claim 7, which comprises transmitting the actuating signals from the control or interlocking facility via a control cable interconnecting the control or interlocking facility and the component.

10. The method according to claim 1, wherein the component is a keylock device containing a key for local operation of another component, and wherein the enable command releases the keylock device.

11. The method according to claim 10, which comprises transmitting the enable command for releasing the keylock device via the radio link from the control or interlocking facility to the mobile communication device and from the mobile communication device to the keylock device via the short-range communication link.

12. The method according to claim 10, which comprises transmitting the enable command from the control or interlocking facility via a control cable interconnecting the keylock device and the control or interlocking facility.

13. A component of a railroad track system, comprising:
a short-range communication device and a control device connected to said short-range communication device;
said control device being configured for processing an interrogator signal received by said short-range communication device via a short-range communication link and requesting a component ID identifying the component; and
said control device being configured for transmitting an ID signal containing the component ID of the component via the short-range communication link.

14. The component according to claim 13, wherein the component is a keylock device configured to be unlocked by a control or interlocking facility of the railroad track system to release a key of the keylock device.

15. An assembly in a railroad track system, the assembly comprising:
a railroad track system component having a short-range communication device and a control device connected to said short-range communication device;
said control device being configured for processing an interrogator signal received by said short-range communication device via a short-range communication link and requesting a component ID identifying the component; and
said control device being configured for transmitting an ID signal containing the component ID of the component via the short-range communication link;
a control or interlocking facility for monitoring and controlling said railroad track system component, said control or interlocking facility having:
a computer device programmed to:
upon receiving the component ID identifying said railroad track system component, check the component ID; and
if the ID check is successful, generate an enable command enabling a local operation of the said railroad track system component.

* * * * *